UNITED STATES PATENT OFFICE.

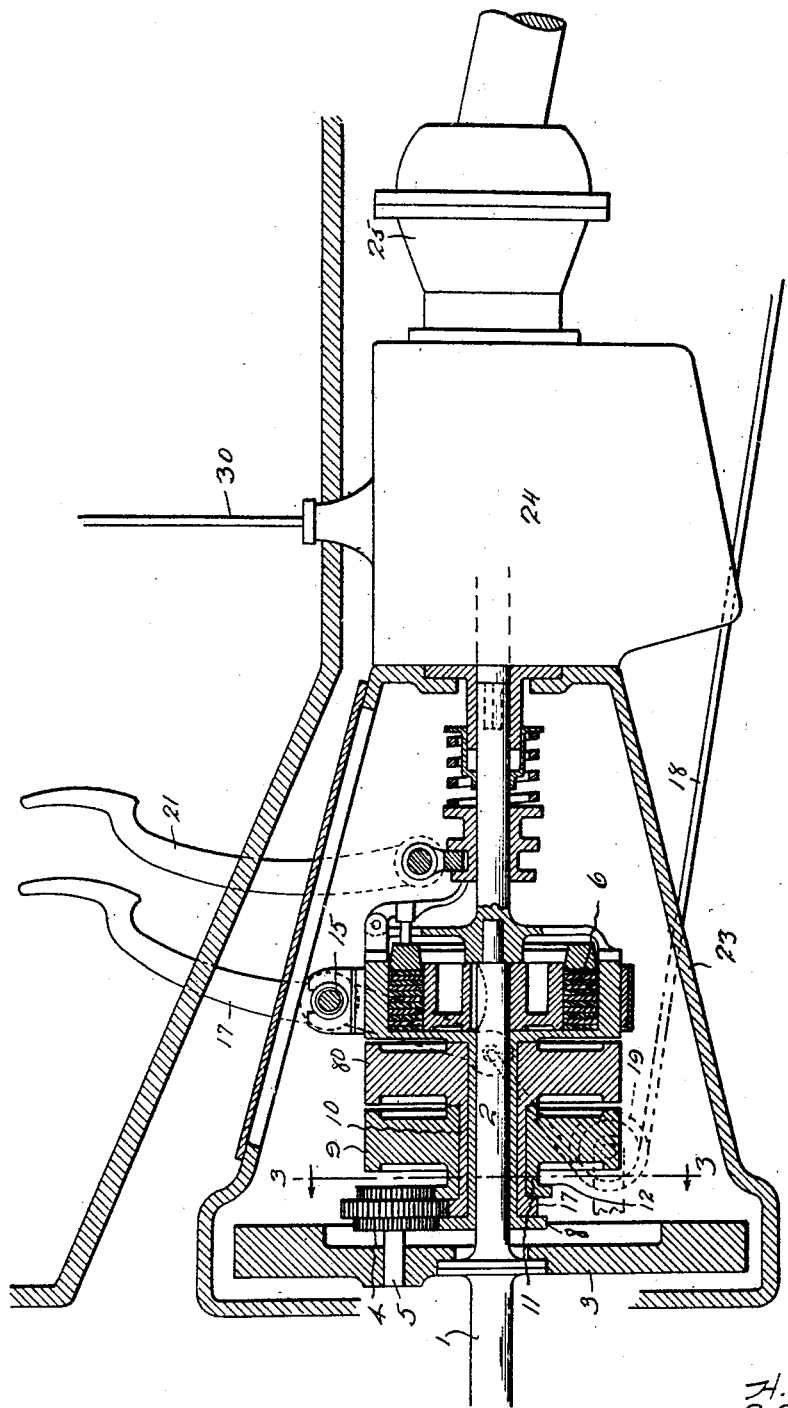

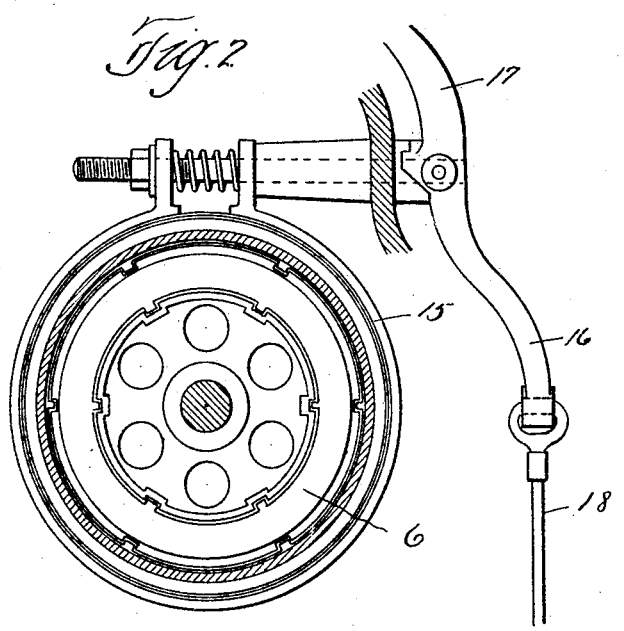
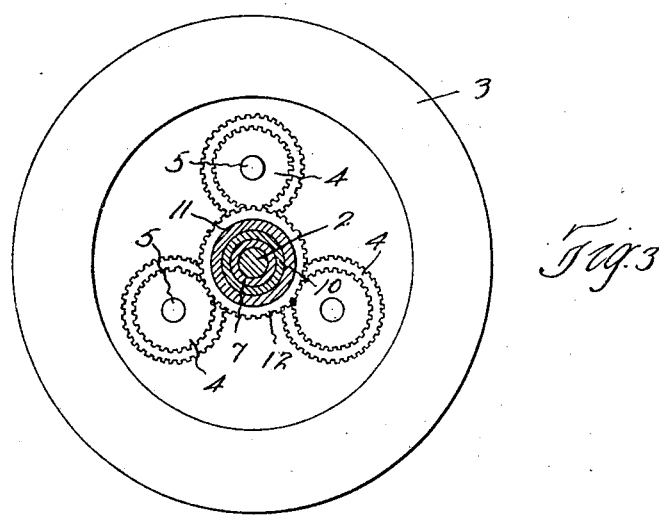

HENRY B. M. CALLUM AND GEORGE S. HOLLISTER, OF CLEVELAND, OHIO; SAID CALLUM ASSIGNOR OF HIS ENTIRE RIGHT TO THE BROOKLYN MANUFACTURING COMPANY, OF CLEVELAND, OHIO, A CORPORATION OF OHIO.

MEANS FOR APPLYING GEAR TRANSMISSION TO FORD CARS.

1,410,163.      Specification of Letters Patent.     Patented Mar. 21, 1922.

Application filed September 16, 1921. Serial No. 501,056.

*To all whom it may concern:*

Be it known that we, HENRY B. M. CALLUM and GEORGE S. HOLLISTER, citizens of the United States, residing at Cleveland, in the county of Cuyahoga and State of Ohio, have invented certain new and useful Improvements in Means for Applying Gear Transmissions to Ford Cars, of which the following is a specification.

This invention relates to means for applying a gear transmission to Ford cars. Heretofore when gear transmissions have been applied to Ford cars the old Ford planetary transmission has been removed. This is a costly job and when said planetary transmission has been removed it has been found that the fly wheel of the Ford is not heavy enough for efficient operation.

In the present invention the result is accomplished by removing the low speed and reverse brake bands and consequently the reverse pedal from the planetary transmission and attaching a shaft of the gear transmission to the shaft of the planetary transmission. This involves the use or combination of a crank shaft, a fly wheel attached thereto, a short stub shaft attached to the crank shaft and fly wheel and extending rearwardly therefrom, a series of weights mounted on the fly wheel, a series of weights mounted on the stub shaft, and means for connecting them together.

In the drawings Fig. 1 shows a central vertical section through a Ford planetary transmission, the low speed and reverse brake bands having been removed and a gear transmission being mounted on the rear end of the planetary transmission housing; Fig. 2 is a detail sectional view illustrating the clutch and transmission and brake and Fig. 3 a section on the line 3—3 of Fig. 1.

The planetary transmission shown in Fig. 1 is very nearly identical with the Ford planetary transmission with the exception that the low speed and reverse brake drums are shown as being somewhat heavier. This will be apparent from comparison with Patent No. 1,005,186 granted to Henry Ford on October 10, 1911.

Referring to the drawings by reference numerals, 1 indicates the motor crank shaft, 2 a short stub shaft connected to the crank shaft and 3 a fly wheel mounted thereon. A set of weights 4 made in the form of multiple gears as is clearly shown in Figs. 1 and 3 are mounted on studs extending outwardly from the fly wheel. A clutch mechanism 6, the same as is shown in said Patent No. 1,005,186, is mounted on the end of the shaft 2 and has a sleeve 7 extending rearwardly therefrom and has a gear 8 on the end thereof which meshes with one of the gears of each of the weights 4. Weights 80 and 9 have rearwardly extending sleeves 10 and 11 on which gears 12 and 13 are mounted concentric with the sleeve 7 as shown, the gears 12 and 13 meshing with the gears of the weights 4, said sleeves and weights of 80 and 9 being mounted on the short shaft 2.

The service brake indicated generally at 15 of the Ford planetary transmission is left intact and an extension 16 is added to the brake pedal 17. A flexible cable 18 is connected to the extension 16 and passes over a pulley 19 and then extends rearwardly to service brakes applied to the exterior of the brake drums on the rear wheels in an ordinary manner. This gives a double braking effect including a transmission brake. A complete description of the clutch generally indicated at 6 and means for shifting the clutch, also a description of the brake generally indicated at 15 can be had from Patent No. 1,005,186. 21 indicates the clutch pedal, 22 the floor boards, 23 the planetary transmission housing, and 24 a housing in which is mounted a standard gear transmission, and 25 indicates the universal joint and means for connecting the drive shaft housing to the transmission, said means being the same as is now used in Ford cars.

The details of the ordinary sliding gear transmission enclosed in the housing 24 are not shown, since it may be any of the suitable or known gear sets, such as those controlled by a shifting lever indicated at 30.

The crank shaft 1 and short shaft 2 are driven by the engine, and the rotation thereof revolves the fly wheel 3 together with the weighted gears 4, and by means of the sleeve and gear connections as shown this rotation also causes rotation of the weights 80 and 9. This gives a large mass in rotation and assists in counter-balancing the motor, and decreases the motor vibration as well as the vibration of the shaft section 2, and this assists in producing an easy operation of the clutch. The large mass in rotation provides a smooth running machine, and the parts also occupy the space which would ordinarily be occupied by the usual Ford transmission, so that reconstruction of the housing and associated parts is unnecessary, the ordinary transmission being as stated removed, and the shaft section 2, with the parts carried thereby, being substituted, together with the addition of the new transmission gear set in the housing 24. By the means described a Ford car can be provided with a sliding gear transmission at small cost, and the smooth and effective operation thereon is assured.

When the clutch is thrown in by the usual operation of the pedal 21 the drive is through the crank shaft 1, shaft section 2, clutch members and transmission in the casing 24, and as the rotation proceeds the weights 80 and 9 are picked up gradually and caused to rotate also. When the brake is applied to the brake drum which carries the sleeve 7 the transmission drive is braked together with the rotation of the weights 80 and 9, but the crank shaft and fly wheel 3, as well as the shaft section 2 can continue to turn at speed, the gears 4 running around the gears 8, 12 and 13. This insures an easy braking action without great shock to the engine.

We claim:

1. The combination with the crank shaft of a Ford car, and a sliding gear transmission, of a short shaft section connected to the crank shaft, a clutch between the short shaft section and said transmission, and a fly wheel carried by said shaft section, said fly wheel being provided with a set of gears, and a plurality of weighted wheels mounted on said shaft section and carried thereby, and geared to said gears.

2. The combination with the crank shaft of a Ford car, and a sliding gear transmission, of a short shaft section attached to the crank shaft, a clutch between the short shaft section and the transmission, a fly wheel carried by said section, and a plurality of weighted wheels carried on said shaft section and rotatable thereon, and having a driving connection with the fly wheel.

3. In an automobile driving gear, the combination of a drive shaft, fly wheel and clutch, of a short shaft section connected to the crank shaft and extending between the same and the clutch said short shaft section being provided with a series of weights thereon geared to the fly wheel, for the purpose described, and a transmission operatively connected to the clutch.

4. In an automobile driving gear the combination with a crank shaft, fly wheel, clutch, and sliding gear transmission, of a short shaft section between the crank shaft and the transmission, the clutch being mounted on the rear end of said shaft section, and a series of rotary weights carried by the short shaft section, between the clutch and the fly wheel and geared to the fly wheel, for the purpose described.

5. In an automobile driving gear the combination with a crank shaft, fly wheel, clutch, and sliding gear transmission, of a short shaft section between the crank shaft and the transmission, the clutch being mounted on the rear end of said shaft section, and a series of rotary weights carried by the short shaft section, between the clutch and the fly wheel, for the purpose described, said weights comprising relatively heavy wheels having concentric sleeves fitting over the shaft section, said sleeves being geared to the fly wheel at their ends.

6. The combination with a crank shaft and clutch, of a short shaft section attached to the crank shaft and carrying one of the clutch members, a brake sleeve mounted on the short shaft section, means to brake the action of said sleeve, a series of revoluble weights mounted loosely on said sleeve, and gearing between said sleeve and weigths and the crank shaft.

In testimony whereof, we affix our signatures in presence of two witnesses.

HENRY B. M. CALLUM.
GEORGE S. HOLLISTER.

Witnesses:
  JOHN A. BOMMHARDT,
  BESSIE F. POLLAK.